United States Patent
Kim et al.

(10) Patent No.: US 12,209,529 B2
(45) Date of Patent: Jan. 28, 2025

(54) VEHICLE CONTROL APPARATUS AND VEHICLE CONTROL METHOD

(71) Applicants: Hyundai Motor Company, Seoul (KR); Kia Corporation, Seoul (KR)

(72) Inventors: Jong Hyuck Kim, Gyeonggi-Do (KR); Jeong Hyeon Kim, Gyeonggi-Do (KR); Hee Jung Yoon, Gyeonggi-Do (KR); Se Jun Park, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/712,896

(22) Filed: Apr. 4, 2022

(65) Prior Publication Data
US 2023/0067392 A1    Mar. 2, 2023

(30) Foreign Application Priority Data

Aug. 26, 2021  (KR) .................. 10-2021-0113331

(51) Int. Cl.
*F01P 7/16* (2006.01)
*B60H 1/00* (2006.01)
(Continued)

(52) U.S. Cl.
CPC ............ *F01P 7/16* (2013.01); *B60H 1/00385* (2013.01); *B60W 20/00* (2013.01); *F01P 7/12* (2013.01);
(Continued)

(58) Field of Classification Search
CPC .......... F01P 7/16; F01P 7/12; F01P 2007/146; F01P 2025/13; F01P 2025/66;
(Continued)

(56) References Cited

U.S. PATENT DOCUMENTS

2018/0291824 A1 * 10/2018 Richards ................. F02B 37/12

FOREIGN PATENT DOCUMENTS

| DE | 102009031504 A1 * | 1/2010 | ............. B60H 1/004 |
| DE | 102013220818 A1 * | 4/2015 | ............... B60H 1/04 |
| JP | 2018135869 A * | 8/2018 | |

OTHER PUBLICATIONS

Machine Translation of JP2018135869A PDF File Name: "JP2018135869A_Machine_Translation.pdf".*

(Continued)

*Primary Examiner* — Grant Moubry
*Assistant Examiner* — Ruben Picon-Feliciano
(74) *Attorney, Agent, or Firm* — Morgan, Lewis & Bockius LLP

(57) ABSTRACT

A vehicle control apparatus includes a detector that detects an external temperature of a vehicle, a vehicle speed, and a coolant temperature of an engine, an input device that receives a signal for ON or OFF operations of a heating control, and a controller configured for determining a heating load depending on the heating control when the external temperature is less than a predetermined temperature and the signal for the ON operation of the heating control is input, and controls an operation of an integrated thermal management valve, a deactivation operation of cylinders included in the engine, and an operation of an active air flap, according to at least one of the heating load and the coolant temperature.

15 Claims, 7 Drawing Sheets

(51) Int. Cl.
*B60W 20/00* (2016.01)
*F01P 7/12* (2006.01)
*F01P 7/14* (2006.01)
*F02D 41/00* (2006.01)
*F02D 41/06* (2006.01)

(52) U.S. Cl.
CPC ....... *F02D 41/0087* (2013.01); *F02D 41/068* (2013.01); *B60W 2510/0676* (2013.01); *B60W 2520/10* (2013.01); *B60W 2555/20* (2020.02); *B60W 2710/0688* (2013.01); *F01P 2007/146* (2013.01); *F01P 2025/13* (2013.01); *F01P 2025/66* (2013.01); *F02D 2200/501* (2013.01); *F02D 2200/703* (2013.01)

(58) Field of Classification Search
CPC .............. B60H 1/00385; B60W 20/00; B60W 2555/20; B60W 2510/0676; B60W 2520/10; B60W 2710/0688; F02D 41/0087; F02D 41/068; F02D 2200/501; F02D 2200/703
See application file for complete search history.

(56) References Cited

OTHER PUBLICATIONS

Machine Translation of DE102013220818A1 PDF File Name: "DE102013220818A1_Machine_Translation.pdf".*
Machine Translation of DE102009031504A1 PDF File Name: "DE102009031504A1_Machine_Translation.pdf".*

* cited by examiner

VEHICLE CONTROL APPARATUS AND VEHICLE CONTROL METHOD

CROSS-REFERENCE TO RELATED APPLICATION

The present application claims priority to Korean Patent Application No. 10-2021-0113331, filed on Aug. 26, 2021, the entire contents of which is incorporated herein for all purposes by this reference.

BACKGROUND OF THE PRESENT DISCLOSURE

Field of the Present Disclosure

The present disclosure relates to a vehicle control apparatus and a vehicle control method.

Description of Related Art

In hybrid vehicles, an integrated thermal management valve (ITM) is applied to a cooling circuit control to distribute a high-temperature engine coolant using a DC motor. The integrated thermal management valve may control a coolant temperature up when the vehicle is driving at a low speed, and may control the coolant temperature down when the vehicle is driving at a high speed or a high load.

Furthermore, the hybrid vehicles are provided with a full automatic temperature controller (FATC) that allows an indoor heating to be performed with the engine coolant heated by a heat of an engine. The full automatic temperature controller may request a warm-up of the engine when an engine coolant temperature is less than a water temperature required for heating.

Furthermore, in the hybrid vehicles, an active air flap provided between a radiator and a radiator grill that introduces outdoor air for cooling power electric (PE) components may be applied, and the active air flap may adjust an amount of air inflow by controlling the opening and closing of the radiator grill.

Furthermore, a cylinder-deactivation (CDA) engine that deactivates some cylinders among all cylinders during braking or driving may be applied to the hybrid vehicles, and a fuel supply, an intake operation, and an exhaust operation are stopped in the deactivated cylinder.

The hybrid vehicles have a limitation in that fuel efficiency and heating efficiency decrease because the above-described integrated thermal management valve, full automatic temperature controller, active air flap, and cylinder-deactivation (CDA) engine operate independently during heating and air conditioning control. For example, in the hybrid vehicles, when the temperature of the PE components is high even though the temperature of the coolant is low, the active air flap is opened to cool the PE components and outdoor air is introduced. This lowers the rise in the coolant temperature, lowering engine combustion efficiency. Accordingly, there is a need to develop a technology capable of securing both fuel efficiency and heating efficiency when controlling heating and air conditioning in the hybrid vehicles.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus and a vehicle control method configured for securing both fuel efficiency and heating efficiency when controlling heating and air conditioning in a hybrid vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus includes a detector that detects an external temperature of a vehicle, a vehicle speed, and a coolant temperature of an engine, an input device that receives a signal for ON or OFF operations of a heating control, and a controller configured for determining a heating load depending on the heating control when the external temperature is less than a predetermined temperature and the signal for the ON operation of the heating control is input, and controls an operation of an integrated thermal management valve, a deactivation operation of cylinders included in the engine, and an operation of an active air flap, according to at least one of the heating load and the coolant temperature.

In an exemplary embodiment of the present disclosure, the controller may turn off the deactivation operation, may control the active air flap to close, and may control the integrated thermal management valve to operate in a first mode when the controller concludes that the vehicle speed exceeds a reference speed and the engine for increasing the coolant temperature is in a warm-up state.

In an exemplary embodiment of the present disclosure, the controller may turn on the deactivation operation, may control the active air flap to close, and may control the integrated thermal management valve to operate in the first mode when the controller concludes that the vehicle speed does not exceed the reference speed, the coolant temperature is less than a first temperature, and the heating load is less than a reference stage.

In an exemplary embodiment of the present disclosure, the first mode may include a mode in which a coolant does not flow to the engine and the coolant temperature is raised.

In an exemplary embodiment of the present disclosure, the controller may turn off the deactivation operation, may control the active air flap to close, and may control the integrated thermal management valve to operate in a second mode when the controller concludes that the vehicle speed does not exceed a reference speed, the coolant temperature is less than a first temperature, and the heating load is greater than or equal to a reference stage.

In an exemplary embodiment of the present disclosure, the controller may turn on the deactivation operation, may control the active air flap to close, and may control the integrated thermal management valve to operate in the second mode when the controller concludes that the vehicle speed does not exceed the reference speed, and the coolant temperature is greater than or equal to the first temperature.

In an exemplary embodiment of the present disclosure, the second mode may include a heating mode in which a coolant flows to a heater.

In an exemplary embodiment of the present disclosure, the controller may be configured to control the integrated thermal management valve to operate in a third mode after the integrated thermal management valve is controlled in a first mode, when the controller concludes that the coolant temperature exceeds a second temperature.

In an exemplary embodiment of the present disclosure, the third mode may include a cooling mode for lowering the coolant temperature.

In an exemplary embodiment of the present disclosure, the controller may be configured to control the active air flap to open when the controller concludes that the coolant temperature exceeds a third temperature which is greater than the second temperature.

According to an aspect of the present disclosure, a vehicle control method includes determining a vehicle speed when an external temperature of a vehicle is less than a predetermined temperature and a signal for an ON operation of a heating control is input, determining a heating load depending on the heating control, and controlling an operation of an integrated thermal management valve, a deactivation operation of cylinders included in an engine, and an operation of an active air flap, according to at least one of the heating load and the coolant temperature.

In an exemplary embodiment of the present disclosure, the controlling of the operation of the integrated thermal management valve, the deactivation operation of the cylinders, and the operation of the active air flap may include turning off the deactivation operation, controlling the active air flap to close, and controlling the integrated thermal management valve to operate in a first mode when the controller concludes that the vehicle speed exceeds a reference speed and the engine for increasing the coolant temperature is in a warm-up state.

In an exemplary embodiment of the present disclosure, the controlling of the operation of the integrated thermal management valve, the deactivation operation of the cylinders, and the operation of the active air flap may include turning on the deactivation operation, controlling the active air flap to close, and controlling the integrated thermal management valve to operate in the first mode when the controller concludes that the vehicle speed does not exceed the reference speed, the coolant temperature is less than a first temperature, and the heating load is less than a reference stage.

In an exemplary embodiment of the present disclosure, the first mode may include a mode in which a coolant does not flow to the engine and the coolant temperature is raised.

In an exemplary embodiment of the present disclosure, the controlling of the operation of the integrated thermal management valve, the deactivation operation of the cylinders, and the operation of the active air flap may include turning off the deactivation operation, controlling the active air flap to close, and controlling the integrated thermal management valve to operate in a second mode when the controller concludes that the vehicle speed does not exceed a reference speed, the coolant temperature is less than a first temperature, and the heating load is greater than or equal to a reference stage.

In an exemplary embodiment of the present disclosure, the controlling of the operation of the integrated thermal management valve, the deactivation operation of the cylinders, and the operation of the active air flap may include turning on the deactivation operation, controlling the active air flap to close, and controlling the integrated thermal management valve to operate in the second mode when the controller concludes that the vehicle speed does not exceed the reference speed, and the coolant temperature is greater than or equal to the first temperature.

In an exemplary embodiment of the present disclosure, the second mode may include a heating mode in which a coolant flows to a heater.

In an exemplary embodiment of the present disclosure, the controlling of the operation of the integrated thermal management valve, the deactivation operation of the cylinders, and the operation of the active air flap may include controlling the integrated thermal management valve to operate in a third mode after the integrated thermal management valve is controlled in a first mode, when the controller concludes that the coolant temperature exceeds a second temperature.

In an exemplary embodiment of the present disclosure, the third mode may include a cooling mode for lowering the coolant temperature.

In an exemplary embodiment of the present disclosure, the controlling of the operation of the integrated thermal management valve, the deactivation operation of the cylinders, and the operation of the active air flap may include controlling the active air flap to open when the controller concludes that the coolant temperature exceeds a third temperature which is greater than the second temperature.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
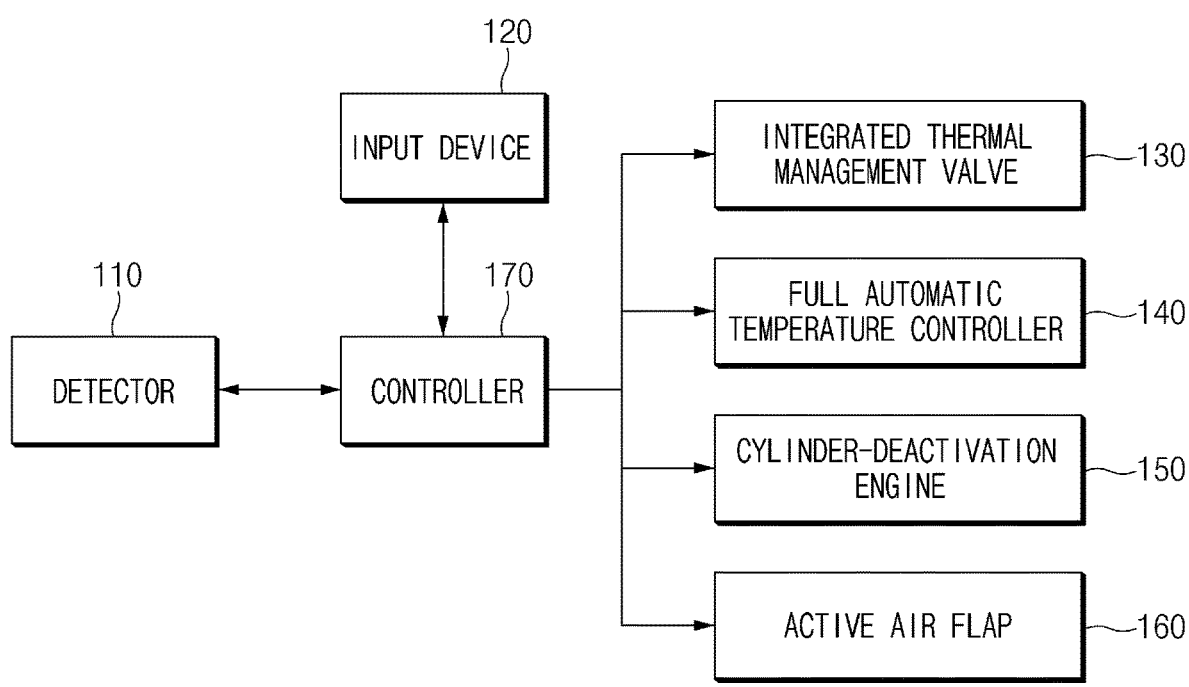
FIG. 1 is a schematic diagram illustrating a vehicle control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the example drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment according to an exemplary embodiment of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a schematic diagram illustrating a vehicle control apparatus according to an exemplary embodiment of the present disclosure.

As illustrated in FIG. 1, a vehicle control apparatus 100 includes a detector 110, an input device 120, an integrated thermal management valve 130, a full automatic temperature controller 140, a cylinder-deactivation engine 150, an active air flap 160, and a controller 170.

The detector 110 may detect an external temperature of a vehicle, a vehicle speed, a coolant temperature, and a heating operation state. According to an exemplary embodiment of the present disclosure, the detector 110 may include a temperature sensor for sensing the external temperature of the vehicle, a vehicle speed sensor for sensing the vehicle speed, and a coolant temperature sensor for sensing the coolant temperature.

The input device 120 may receive a signal for an on or off operation of the heating control. Furthermore, the input device 120 may adjust heating intensity when the heating control is in on state. The controller 170 may determine a heating load according to the heating intensity.

According to the exemplary embodiment of the present disclosure, the input device 120 may receive a signal corresponding to a manual, an operation, or a voice of an occupant, and the controller 170 may control a heating on or a heating off based on an input signal. The input device 120 may be implemented with a scroll wheel, a button, a knob, a touch screen, a touch pad, a lever, a track ball, etc. which may be manipulated by the occupant, with at least one of a motion detector and a voice recognition detector for sensing the occupant's motion or voice, or with a combination thereof.

The integrated thermal management valve 130 may operate in any one of a first mode that allows a coolant not to flow into an engine and allows the coolant temperature to rise, a second mode that includes a heating mode that allows the coolant to flow into a heater, and a third mode including a cooling mode that allows the coolant temperature to drop.

The full automatic temperature controller (FATC) 140 may control an indoor heating to be performed with the engine coolant heated by the heat of the engine. When the coolant temperature is lower than a water temperature required for heating, the full automatic temperature controller 140 may request the controller 170 to warm-up of the engine.

The cylinder-deactivation engine 150 may include an engine in which some cylinders among all cylinders are deactivated during braking or driving, and a fuel supply, an intake operation, and an exhaust operation are stopped in the deactivated cylinders. The deactivation operation of the cylinder-deactivation engine 150 may be turned off when the controller 170 receives a request for warming up the engine or the heating is in a high-load state. The deactivation operation may be turned on when trying to improve the fuel efficiency while the heating is in a low-load state.

The active air flap (AAF) 160 may be provided between the radiator and the radiator grill for introducing outdoor air for cooling of the PE components. The active air flap 160 may control the opening and closing of the radiator grill to adjust an amount of air inflow.

The controller 170 may be implemented by various processing devices such as a microprocessor in which a semiconductor chip configured for performing determination or execution of various commands is embedded, and the like, and may control an operation of the vehicle control apparatus according to an exemplary embodiment of the present disclosure.

In detail, when the external temperature is less than a predetermined temperature and a signal for the ON operation of the heating control is input, the controller 170 may determine the heating load according to the heating control, and may control an operation of the integrated thermal management valve, a deactivation operation of cylinders included in the engine, and an operation of the active air flap, based on one or more of the heating load and the coolant temperature of the engine.

According to an exemplary embodiment of the present disclosure, the controller 170 may determine whether an ignition of the vehicle is in an on state, and whether vehicle driving enters a hybrid electric vehicle (HEV) mode after an electric vehicle (EV) mode.

When the vehicle driving enters the HEV mode, the controller 170 may determine whether the external temperature of the vehicle is less than a predetermined temperature and the signal for the ON operation of the heating control is input. In the instant case, the case where the external temperature of the vehicle is less than the predetermined temperature may include a case where the external temperature is below zero degrees Celsius.

The controller 170 may determine whether the vehicle speed exceeds a reference speed when the external temperature is less than the predetermined temperature and the signal for the ON operation of the heating control is input. In the instant case, the reference speed may include 60 km/h.

The controller 170 may receive a request for warming up of the engine when the coolant temperature is less than the water temperature required for heating as the coolant temperature is lowered due to the vehicle speed exceeding the reference speed.

The controller 170 may perform the warm-up of the engine to increase the coolant temperature, and may turn off the deactivation operation of cylinders in the engine to rapidly increase the coolant temperature. Furthermore, the controller 170 may control the closing of the active air flap 160 to maximize an upward efficiency of the coolant temperature, and may allow the integrated thermal management valve 130 to operate in the first mode. In the instant case, the first mode may include a mode in which the coolant does not flow into the engine and the coolant temperature is raised.

As described above, according to an exemplary embodiment of the present disclosure, the controller 170 may turn off the deactivation operation of cylinders in the engine, may allow the active air flap to be closed even when the coolant temperature is lowered because the vehicle speed exceeds the reference speed, and may allow the integrated thermal management valve 130 to operate in the first mode. Accordingly, heat source loss during engine warm-up is minimized, and thus operating efficiency may be increased.

According to another exemplary embodiment of the present disclosure, when the vehicle speed does not exceed the reference speed, the controller 170 may determine whether the coolant temperature is less than a first temperature. When it is determined that the coolant temperature is less than the first temperature, the controller 170 may determine whether the warm-up to increase the coolant temperature is performed. In the instant case, the first temperature may be set to 70 degrees Celsius.

When the warm-up is not performed, the controller 170 may determine that the water temperature required for heating is satisfied, and may determine whether the full automatic temperature controller 140 turns on the control of the engine for performing heating.

When it is determined that the full automatic temperature controller 140 turns on the control of the engine for performing heating, the controller 170 may determine the heating load depending on the heating control, and may determine whether the heating load is less than a reference stage. According to the exemplary embodiment of the present disclosure, the controller 170 may determine whether an intensity of a blower for heating is less than a set stage (e.g., a three stage), and may determine that the heating load is less than the reference stage, when the intensity of the blower is less than the set stage. In the instant case, the intensity of the blower may be set by an input of the occupant.

When it is determined that the heating load is less than the reference stage, the controller 170 may determine that the heating load is in the low-load state, and when the heating load is in the low-load state, the controller 170 may allow the deactivation operation of cylinders in the engine to be turned on to reduce unnecessary fuel consumption. Furthermore, the controller 170 may control the closing of the active air flap 160 to maximize the upward efficiency of the coolant temperature, and may allow the integrated thermal management valve 130 to operate in the first mode. In the instant case, the first mode may include a mode in which the coolant does not flow into the engine and the coolant temperature is raised.

As described above, according to an exemplary embodiment of the present disclosure, when the vehicle speed is less than the reference speed and the heating load is in the low-load state, the controller 170 may allow the active air flap to be closed to maintain the coolant temperature so that a combustion efficiency of the engine may be increased, and the controller 170 may allow the deactivation operation to be turned on so that the fuel efficiency may be improved.

According to another exemplary embodiment of the present disclosure, when it is determined that the heating load is not less than the reference stage, the controller 170 may determine that the heating load is in the high-load state. When the heating load is in the high-load state, the controller 170 may allow the deactivation operation of cylinders in the engine to be turned off, may control the closing of the active air flap 160, and may allow the integrated thermal management valve 130 to operate in the second mode. In the instant case, the second mode may include a heating mode in which the coolant flows into the heater.

As described above, according to an exemplary embodiment of the present disclosure, the controller 170 may allow the deactivation operation of cylinders in the engine to be turned off when the heating load is in the high-load state, rapidly increasing the heating efficiency, and may allow the active air flap 160 to be closed, and may allow the integrated thermal management valve 130 to operate in the heating mode, increasing the heating effect.

According to another exemplary embodiment of the present disclosure, when the vehicle speed does not exceed the reference speed, the controller 170 may determine whether the coolant temperature is less than the first temperature. When it is determined that the coolant temperature is not less than the first temperature, the controller 170 may determine that the coolant temperature is in a high temperature state, and may allow the deactivation operation of cylinders in the engine to be turned on to suppress an unnecessary increase in the coolant temperature and minimize fuel loss. Furthermore, the controller 170 may control the closing of the active air flap 160 to prevent a rapid decrease of the coolant temperature, and the integrated thermal management valve 130 to operate in the second mode to increase the heating efficiency using the high-temperature coolant. In the instant case, the second mode may include the heating mode in which the coolant flows into the heater.

Since the coolant temperature rises when the integrated thermal management valve 130 is controlled to operate in the first mode in a state where the heating load is the low-load, the controller 170 may determine whether the coolant temperature exceeds a second temperature. In the instant case, the second temperature may be 50 degrees Celsius.

When it is determined that the coolant temperature exceeds the second temperature, the controller 170 may determine that the cooling is required for the coolant temperature. Accordingly, the controller 170 may allow the integrated thermal management valve 130 to operate in the third mode. In the instant case, the third mode may include the cooling mode in which the coolant is circulated through a predetermined path by controlling the opening amount of the integrated thermal management valve 130.

The controller 170 may determine whether the coolant temperature exceeds a third temperature when the integrated thermal management valve 130 is controlled to operate in the third mode. In the instant case, the third temperature may be 60 degrees Celsius.

When it is determined that the coolant temperature exceeds the third temperature, the controller 170 may determine that an additional operation for cooling the coolant temperature is required in addition to the control to operate the integrated thermal management valve 130 in the third mode. According to an exemplary embodiment of the present disclosure, the controller 170 may control the active air flap 160 to open and allow outdoor air to flow in to cool the coolant temperature.

FIG. 2, FIG. 3, FIG. 4, FIG. 5 and FIG. 6 are flowcharts illustrating a vehicle control method according to an exemplary embodiment of the present disclosure.

Figure 2:
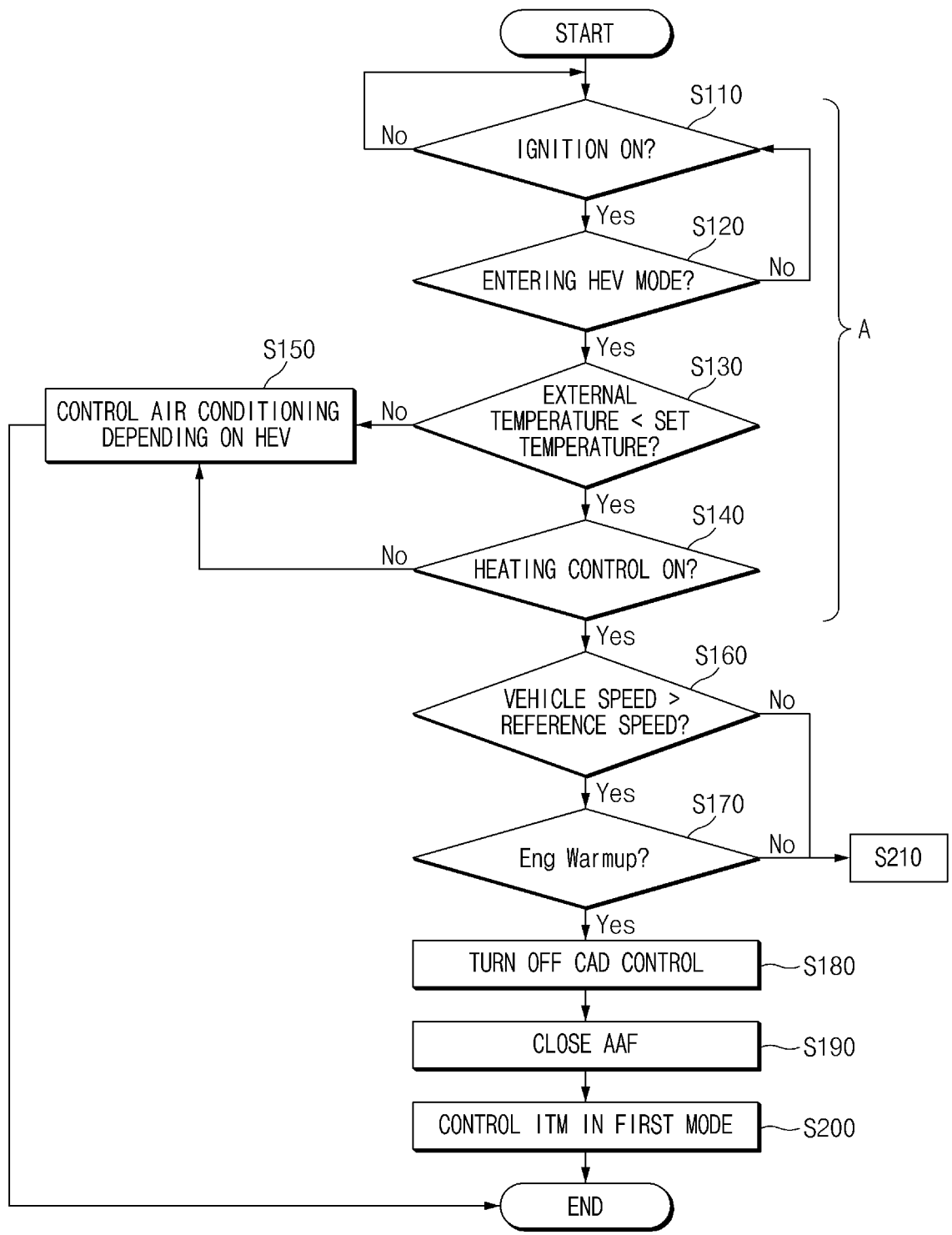
FIG. 2, FIG. 3, FIG. 4, FIG. 5 and FIG. 6 are flowcharts illustrating a vehicle control method according to an exemplary embodiment of the present disclosure.

As illustrated in FIG. 2, the controller 170 may determine whether the ignition is in the on state (S110). In S110, when the ignition is in the on state (Yes), the controller 170 may determine whether the vehicle enters the hybrid electric vehicle (HEV) mode after the electric vehicle (EV) mode (S120). In S110, the controller 170 may determine again whether the ignition is in the on state when the ignition is not in the on state.

In S120, when the vehicle enters the HEV mode (Yes), the controller 170 may determine whether the external temperature of the vehicle is less than the predetermined temperature (S130). According to an exemplary embodiment of the present disclosure, when the controller 170 determines that the external temperature of the vehicle is less than the predetermined temperature (Yes) in S130, the external temperature may be below zero degrees Celsius.

When it is determined that the external temperature of the vehicle is less than the predetermined temperature in S130, the controller 170 may determine whether the signal for the ON operation of the heating control is input (S140). When it is determined that the external temperature of the vehicle is not less than the predetermined temperature (No) in S130 or that the signal for the ON operation of the heating control is not input in S140 (No), the controller 170 may control the air conditioning depending on the driving in the HEV mode (S150).

When it is determined that the signal for the ON operation of the heating control is input in S140, the controller 170 may determine whether the vehicle speed exceeds the reference speed (S160). In the instant case, the reference speed may include 60 km/h.

In S160, the controller 170 may receive a request for warming up the engine when the coolant temperature is lower than the water temperature required for heating as the coolant temperature is lowered due to the vehicle speed exceeding the reference speed.

The controller 170 may determine whether the warm-up of the engine is performed to increase the coolant temperature (S170), and when it is determined that the warm-up of the engine is performed in S170 (Yes), the controller 170 may allow the deactivation operation of cylinders in the engine to be turned off to rapidly raise the coolant temperature (S180). When the warm-up of the engine is not performed in S170, the controller 170 may determine whether the coolant temperature is less than the first temperature as illustrated in S210 of FIG. 3.

Furthermore, the controller 170 may control the active air flap 160 to close to maximize the upward efficiency of the coolant temperature (S190), and may allow the integrated thermal management valve 130 to operate in the first mode (S200). In the instant case, the first mode may include a mode in which the coolant does not flow into the engine and the coolant temperature is raised.

As described above, according to an exemplary embodiment of the present disclosure, even when the coolant temperature is lowered as the vehicle speed exceeds the reference speed, the controller 170 may allow the deactivation operation of cylinders in the engine to be turned off, may control the active air flap to be closed, and may allow the integrated thermal management valve 130 to operate in the first mode. Accordingly, it is possible to minimize the heat source loss during the warm-up of the engine, increasing operating efficiency.

Figure 3:
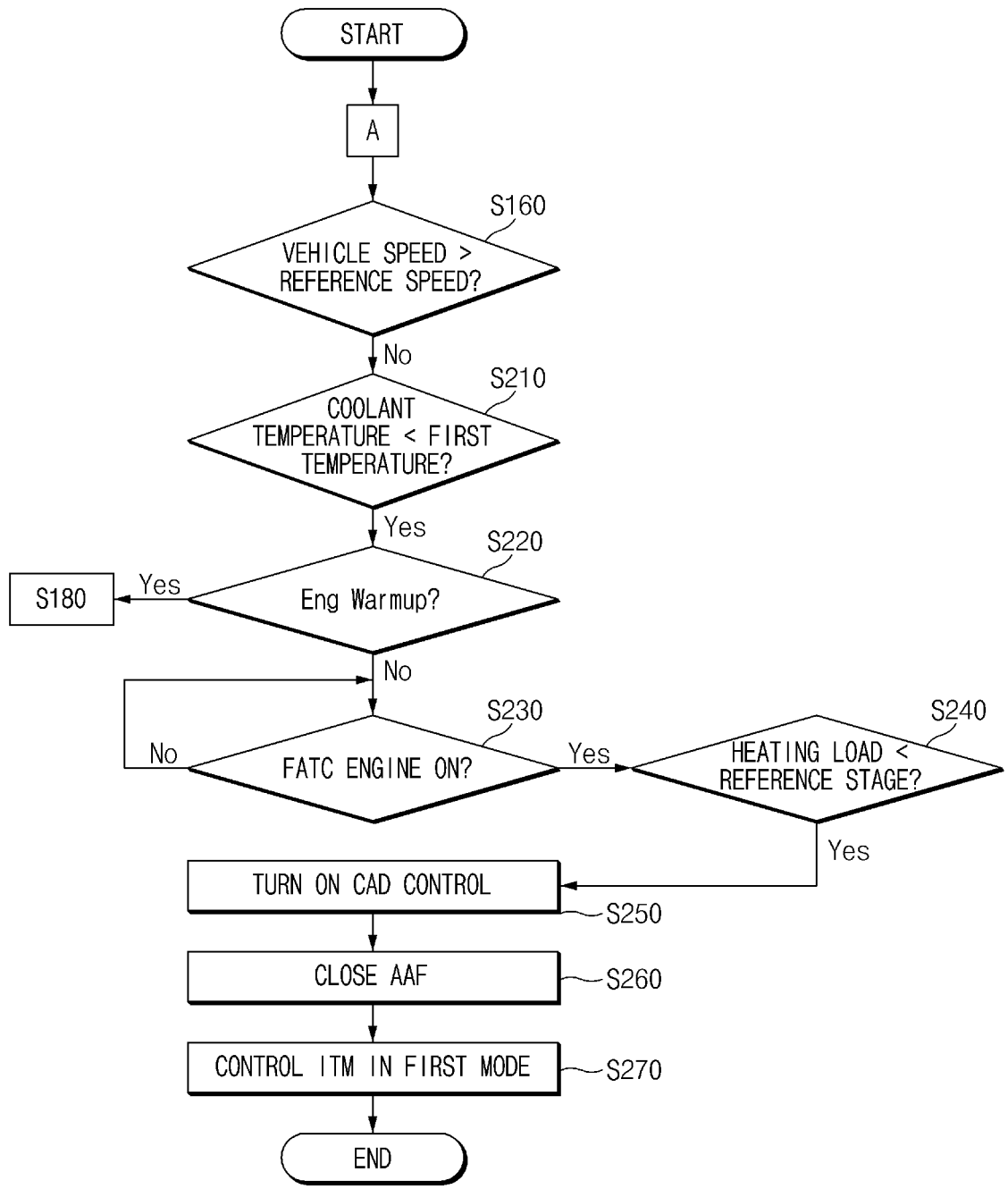

As illustrated in FIG. 3, the controller 170 may perform operation 'A' including S110 to S140 of FIG. 2.

According to the exemplary embodiment of the present disclosure, when it is determined that the signal for the ON operation of the heating control is input in S140 of FIG. 2 (Yes), the controller 170 may determine whether the vehicle speed exceeds the reference speed (S160).

When it is determined that the vehicle speed does not exceed the reference speed (No) in S160, the controller 170 may determine whether the coolant temperature is less than the first temperature (S210). When it is determined that the coolant temperature is less than the first temperature (Yes) in S210 of FIG. 3, the controller 170 may determine whether the warm-up to increase the coolant temperature is performed (S220). In the instant case, the first temperature may be set to 70 degrees Celsius.

When the warm-up is not performed (No) in S220, the controller 170 may determine that the water temperature required for heating is satisfied, and the controller 170 may determine whether the full automatic temperature controller 140 turns on the control of the engine for performing heating (S230). When it is determined in S220 that the warm-up is performed (Yes), the controller 170 may perform S180 of FIG. 2.

When it is determined that the full automatic temperature controller 140 turns on the control of the engine for performing heating (Yes) in S230, the controller 170 may determine the heating load depending on the heating control, and may determine whether the heating load is less than the reference stage (S240). According to the exemplary embodiment of the present disclosure, in S240, the controller 170 may determine whether the intensity of the blower for heating is less than the set stage (e.g., the three stage). When the intensity of the blower is less than the set stage, the controller 170 may determine that the heating load is less than the reference stage. When it is determined in S230 that the control of the engine for heating is not turned on (No), the controller 170 may continuously determine whether the control of the engine for performing heating is turned on.

When it is determined in S240 that the heating load is less than the reference stage (Yes), the controller 170 may determine that the heating load is in the low-load state. When it is determined that the heating load is in the low-load state, the controller 170 may allow the deactivation operation of cylinders in the engine to be turned on to reduce unnecessary fuel consumption (S250). Furthermore, the controller 170 may control the active air flap 160 to close to maximize the upward efficiency of the coolant temperature (S260) and may allow the integrated thermal management valve 130 to operate in the first mode (S270). In the instant case, the first mode may include the mode in which the coolant does not flow into the engine and the coolant temperature is raised.

As described above, according to an exemplary embodiment of the present disclosure, when the vehicle speed is less than the reference speed and the heating load is in the low-load state, the controller 170 may control the active air flap to be closed to maintain the coolant temperature so that combustion efficiency of the engine may be increased, and may allow the deactivation operation to be turned on so that the fuel efficiency may be improved.

Figure 4:
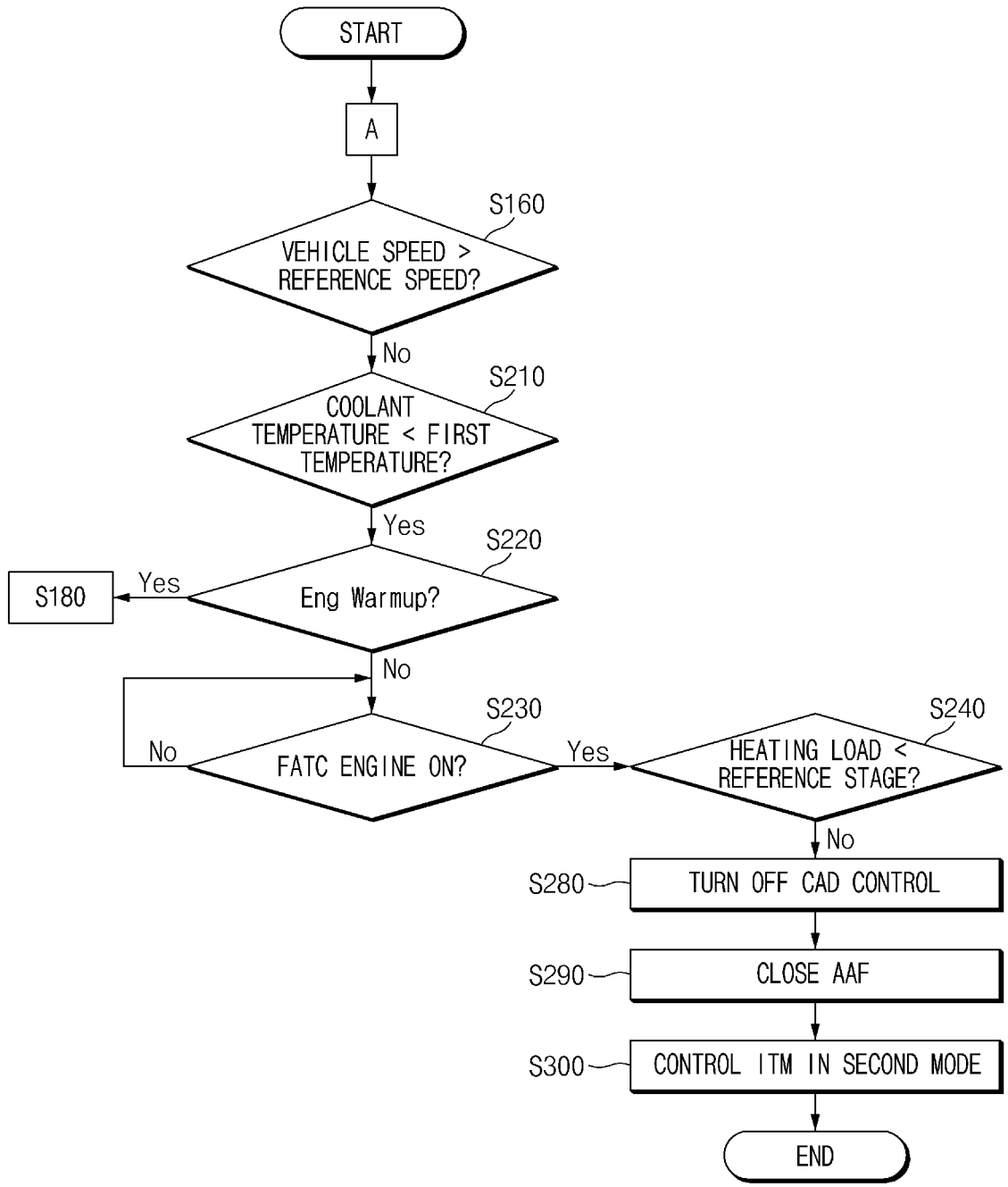

As illustrated in FIG. 4, the controller 170 may perform operation 'A' including S110 to S140 of FIG. 2.

According to the exemplary embodiment of the present disclosure, when it is determined that the signal for the ON operation of the heating control is input in S140 of FIG. 2 (Yes), the controller 170 may determine whether the vehicle speed exceeds the reference speed (S160).

When it is determined that the vehicle speed does not exceed the reference speed in S160 (No), the controller 170 may determine whether the coolant temperature is less than the first temperature (S210). When it is determined that the coolant temperature is less than the first temperature (Yes) in S210, the controller 170 may determine whether the warm-up to increase the coolant temperature is performed (S220). In the instant case, the first temperature may be set to 70 degrees Celsius.

When the warm-up is not performed (No) in S220, the controller 170 may determine that the water temperature required for heating is satisfied, and may determine whether the full automatic temperature controller 140 turns on the control of the engine for performing heating (S230). When it is determined in S220 that the warm-up is performed (Yes), the controller 170 may perform S180 of FIG. 2.

When it is determined in S230 that the full automatic temperature controller 140 turns on the control of the engine for performing heating (Yes), the controller 170 may determine which may determine the heating load depending on the heating control, and may determine whether the heating load is less than the reference stage (S240).

When it is determined in S240 that the heating load is not less than the reference stage (No), the controller 170 may determine that the heating load is in the high-load state. When the heating load is in the high-load state, the controller 170 may allow the deactivation operation of cylinders in the engine to be turned off (S280), may allow the active air flap 160 to be closed (S290), and may allow the integrated thermal management valve 130 to operate in the second mode (S300). In the instant case, the second mode may include a heating mode in which coolant flows into the heater.

As described above, according to an exemplary embodiment of the present disclosure, when the heating load is in the high-load state, the controller 170 may allow the deactivation operation of cylinders in the engine to be turned off, rapidly increasing the heating efficiency, may allow the active air flap 160 to be closed, and may allow the integrated thermal management valve 130 to operate in the heating mode, increasing the heating effect.

Figure 5:
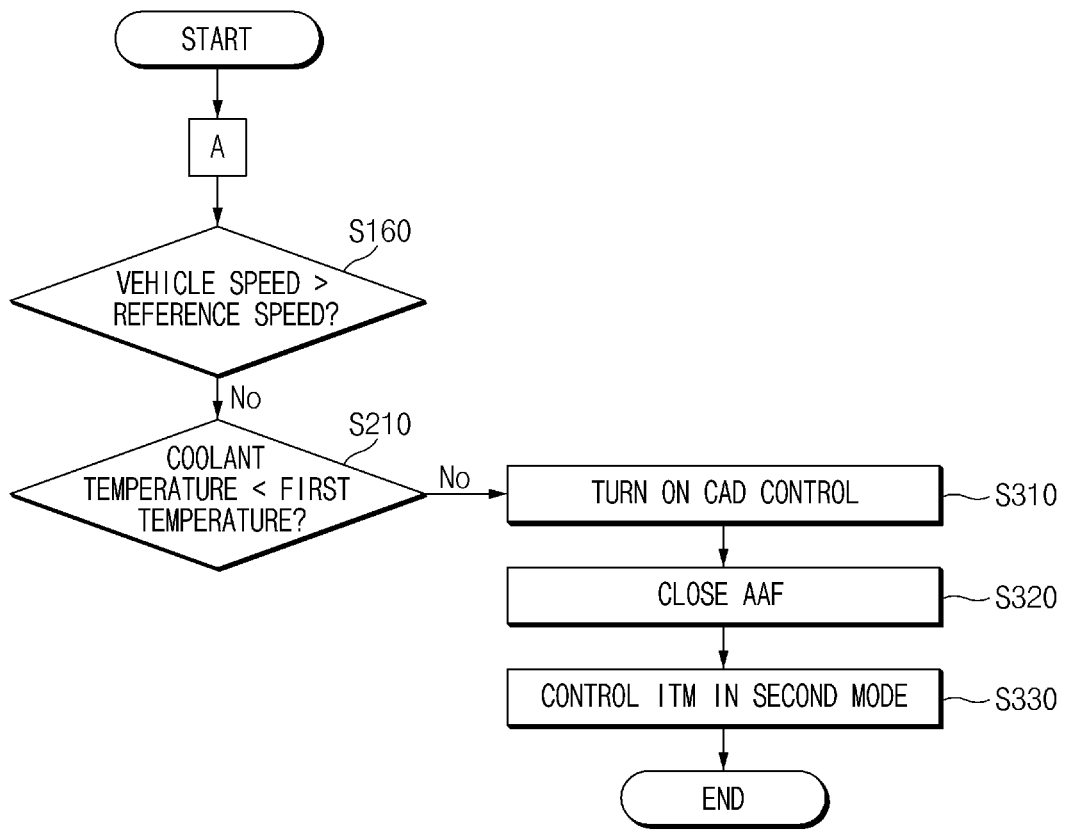

As illustrated in FIG. 5, the controller 170 may perform operation 'A' including S110 to S140 of FIG. 2.

According to the exemplary embodiment of the present disclosure, when it is determined that the signal for the ON operation of the heating control is input in S140 of FIG. 2 (Yes), the controller 170 may determine whether the vehicle speed exceeds the reference speed (S160).

When it is determined in S160 that the vehicle speed does not exceed the reference speed (No), the controller 170 may determine whether the coolant temperature is less than the first temperature (S210). When it is determined in S210 that the coolant temperature is not less than the first temperature (No), the controller 170 may determine that the coolant temperature is in the high-temperature state, and may allow the deactivation operation of cylinders in the engine to be turned on to suppress an unnecessary increase in the coolant temperature and minimize fuel loss (S310).

Furthermore, the controller 170 may allow the active air flap 160 to be closed to prevent a rapid decrease in the coolant temperature (S320), and may allow the integrated thermal management valve 130 to operate in the second mode so that heating efficiency is increased by use of the high-temperature coolant (S330). In the instant case, the second mode may include a heating mode in which the coolant flows into the heater.

Figure 6:
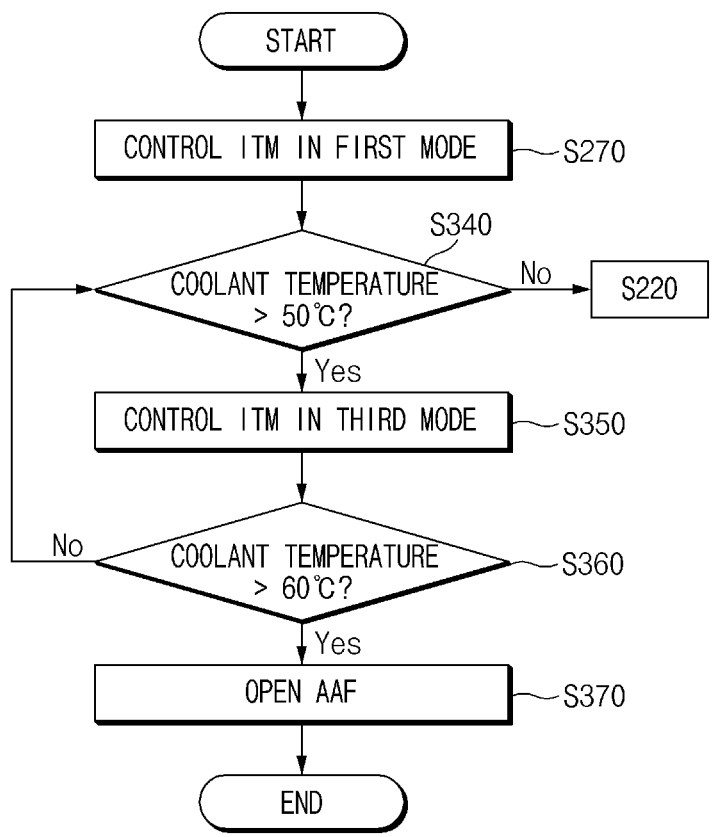

As illustrated in FIG. 6, since the coolant temperature rises when the integrated thermal management valve 130 is controlled to operate in the first mode in a state where the heating load is in the low-load (S270), the controller 170 may determine whether the coolant temperature exceeds the second temperature (S340). In the instant case, the second temperature may be 50 degrees Celsius.

When it is determined in S340 that the coolant temperature exceeds the second temperature (Yes), the controller 170 may determine that the cooling is required for the coolant temperature. Accordingly, the controller 170 may allow the integrated thermal management valve 130 to operate in the third mode. In the instant case, the third mode may include the cooling mode in which the coolant is circulated through a predetermined path by controlling the opening amount of the integrated thermal management valve 130.

When it is determined that the coolant temperature does not exceed the second temperature in S340, the controller 170 may perform S220. In detail, when it is determined in S340 that the coolant temperature does not exceed the second temperature, the controller 170 may determine whether the warm-up of the engine to increase the coolant temperature is performed (S220 of FIG. 4).

When the integrated thermal management valve 130 is controlled to operate in the third mode in S350, the controller 170 may determine whether the coolant temperature exceeds the third temperature (S360). In the instant case, the third temperature may be 60 degrees Celsius.

When it is determined that the coolant temperature exceeds the third temperature in S360 (Yes), the controller 170 may determine that an additional operation for cooling the coolant temperature is required in addition to the control to operate the integrated thermal management valve 130 in the third mode. According to an exemplary embodiment of the present disclosure, the controller 170 may allow the active air flap 160 to be opened (S370). The controller 170 may allow external air to flow in to cool the coolant temperature by controlling the opening of the active air flap 160.

Figure 7:
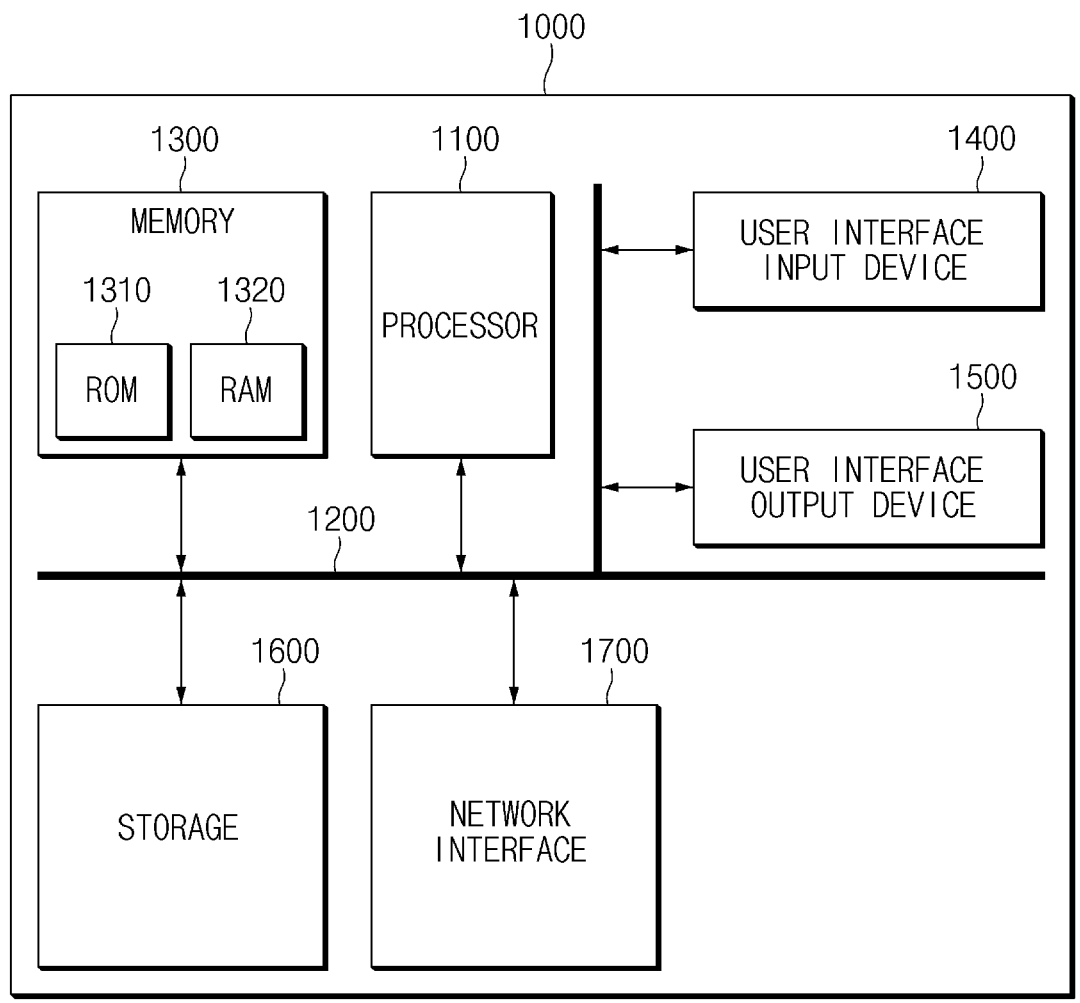
FIG. 7 is a diagram illustrating a configuration of a determining system for executing a method according to an exemplary embodiment of the present disclosure.

FIG. 7 is a diagram illustrating a configuration of a computing system for executing a method according to an exemplary embodiment of the present disclosure.

Referring to FIG. 7, a computing system 1000 may include at least one processor 1100, a memory 1300, a user interface input device 1400, a user interface output device 1500, storage 1600, a network interface 1700, which are connected through a bus 1200.

The processor 1100 may be a central processing unit (CPU) or a semiconductor device that executes processing on instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the method or the steps of algorithm described in connection with the exemplary embodiments included herein may be implemented directly in hardware, a software module, or a combination of the two, which is executed by the processor 1100. The software module may reside in a storage medium (i.e., the memory 1300 and/or the storage 1600) such as a RAM, a flash memory, a ROM, an EPROM, an EEPROM, a register, a hard disk, a removable disk, and a CD-ROM. The storage medium as an example is coupled to the processor 1100, the processor 1100 may read information from, and write information to, the storage medium. Alternatively, the storage medium may be integrated with the processor 1100. The processor and storage medium may reside within an application specific integrated circuit (ASIC). The ASIC may reside within the user terminal. Alternatively, the processor and storage medium may reside as separate components within the user terminal.

According to an exemplary embodiment of the present disclosure, a vehicle control apparatus and method may maintain operations of vehicle components in an optimal state and may improve heating performance by securing both fuel efficiency and heating efficiency in a hybrid vehicle.

The above description is merely illustrative of the technical idea of the present disclosure, and those of ordinary skill in the art to which the present disclosure pertains will be able to make various modifications and variations without departing from the essential characteristics of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus comprising:
   a detector configured to detect an external temperature of a vehicle, a vehicle speed, and a coolant temperature of an engine;
   an input device configured to receive a signal for ON or OFF operations of a heating control in response to an input of an occupant of the vehicle; and
   a controller configured to determine a heating load depending on the heating control when the external temperature is less than a predetermined temperature and the signal for the ON operation of the heating control is input in response to the input of the occupant of the vehicle, and to control an operation of an integrated thermal management valve, a deactivation operation of cylinders mounted in the engine, and an operation of an active air flap when driving mode of the vehicle enters HEV (Hybrid Electric Vehicle) mode, according to at least one of the heating load and the coolant temperature,
   wherein the vehicle includes a hybrid vehicle,
   wherein the controller is configured to control the integrated thermal management valve to operate in a third mode after the integrated thermal management valve is controlled in a first mode, when the controller concludes that the coolant temperature exceeds a second temperature,
   wherein the first mode includes a mode in which a coolant does not flow to the engine and the coolant temperature is raised, and
   wherein the third mode includes a cooling mode for lowering the coolant temperature.

2. The vehicle control apparatus of claim 1, wherein the controller is configured to turn off the deactivation operation, to control the active air flap to close, and to control the integrated thermal management valve to operate in the first mode when the controller concludes that the vehicle speed exceeds a reference speed and the engine for increasing the coolant temperature is in a warm-up state.

3. The vehicle control apparatus of claim 2, wherein the controller is configured to turn on the deactivation operation, to control the active air flap to close, and to control the integrated thermal management valve to operate in the first mode when the controller concludes that the vehicle speed does not exceed the reference speed, the coolant temperature is less than a first temperature, and the heating load is less than a reference stage.

4. The vehicle control apparatus of claim 1, wherein the controller is configured to turn off the deactivation operation, to control the active air flap to close, and to control the integrated thermal management valve to operate in a second mode when the controller concludes that the vehicle speed does not exceed a reference speed, the coolant temperature is less than a first temperature, and the heating load is greater than or equal to a reference stage.

5. The vehicle control apparatus of claim 4, wherein the controller is configured to turn on the deactivation operation, to control the active air flap to close, and to control the integrated thermal management valve to operate in the second mode when the controller concludes that the vehicle speed does not exceed the reference speed, and the coolant temperature is greater than or equal to the first temperature.

6. The vehicle control apparatus of claim 5, wherein the second mode includes a heating mode in which a coolant flows to a heater.

7. The vehicle control apparatus of claim 1, wherein the controller is configured to control the active air flap to open when the controller concludes that the coolant temperature exceeds a third temperature which is greater than the second temperature.

8. A vehicle control method comprising:
   determining, by a controller, a vehicle speed when an external temperature of a vehicle is less than a predetermined temperature and a signal for an ON operation of a heating control is input in response to an input of an occupant of the vehicle;
   determining, by the controller, a heating load depending on the heating control; and
   controlling, by the controller, an operation of an integrated thermal management valve, a deactivation operation of cylinders included in an engine, and an operation of an active air flap, when driving mode of the vehicle enters HEV (Hybrid Electric Vehicle) mode, according to at least one of the heating load and a coolant temperature,
   wherein the vehicle includes a hybrid vehicle,
   wherein the controlling of the operation of the integrated thermal management valve, the deactivation operation of the cylinders, and the operation of the active air flap includes:
      controlling the integrated thermal management valve to operate in a third mode after the integrated thermal management valve is controlled in a first mode, when the controller concludes that the coolant temperature exceeds a second temperature,
   wherein the first mode includes a mode in which a coolant does not flow to the engine and the coolant temperature is raised, wherein the third mode includes a cooling mode for lowering the coolant temperature.

9. The vehicle control method of claim 8, wherein the controlling of the operation of the integrated thermal management valve, the deactivation operation of the cylinders, and the operation of the active air flap includes:
turning off the deactivation operation, controlling the active air flap to close, and controlling the integrated thermal management valve to operate in the first mode when the controller concludes that the vehicle speed exceeds a reference speed and the engine for increasing the coolant temperature is in a warm-up state.

10. The vehicle control method of claim 9, wherein the controlling of the operation of the integrated thermal management valve, the deactivation operation of the cylinders, and the operation of the active air flap includes:
turning on the deactivation operation, controlling the active air flap to close, and controlling the integrated thermal management valve to operate in the first mode when the controller concludes that the vehicle speed does not exceed the reference speed, the coolant temperature is less than a first temperature, and the heating load is less than a reference stage.

11. The vehicle control method of claim 10, wherein the first mode includes a mode in which a coolant does not flow to the engine and the coolant temperature is raised.

12. The vehicle control method of claim 8, wherein the controlling of the operation of the integrated thermal management valve, the deactivation operation of the cylinders, and the operation of the active air flap includes:
turning off the deactivation operation, controlling the active air flap to close, and controlling the integrated thermal management valve to operate in a second mode when the controller concludes that the vehicle speed does not exceed a reference speed, the coolant temperature is less than a first temperature, and the heating load is greater than or equal to a reference stage.

13. The vehicle control method of claim 12, wherein the controlling of the operation of the integrated thermal management valve, the deactivation operation of the cylinders, and the operation of the active air flap includes:
turning on the deactivation operation, controlling the active air flap to close, and controlling the integrated thermal management valve to operate in the second mode when the controller concludes that the vehicle speed does not exceed the reference speed, and the coolant temperature is greater than or equal to the first temperature.

14. The vehicle control method of claim 13, wherein the second mode includes a heating mode in which a coolant flows to a heater.

15. The vehicle control method of claim 8, wherein the controlling of the operation of the integrated thermal management valve, the deactivation operation of the cylinders, and the operation of the active air flap includes:
controlling the active air flap to open when the controller concludes that the coolant temperature exceeds a third temperature which is greater than the second temperature.

* * * * *